3,008,933
INTERPOLYESTERS OF BIBENZOIC ACID, AN ALIPHATIC DICARBOXYLIC ACID AND A GLYCOL

Edward A. Wielicki, Philadelphia, and Robert D. Evans, West Chester, Pa., assignors to American Viscose Corporation, Philadelphia, Pa., a corporation of Delaware
No Drawing. Filed July 28, 1958, Ser. No. 751,169
5 Claims. (Cl. 260—75)

This invention relates to new and useful interpolyesters, shaped articles prepared therefrom and methods of preparing the same. More particularly it is directed to unique interpolyesters of bibenzoic acid, a glycol and an aliphatic dicarboxylic acid. This invention relates further to films, fibers, molded products, coatings and other shaped articles prepared from the unique interpolyesters described above.

The history of polyesters is a relatively short but active one. Condensation polyesters, while encountered in early researches such as those of Lourenco, Bischoff, Fischer, etc., were not intensively studied until 1928, when Carothers and coworkers began a systematic study of condensation polymerization. Illustrative of Carothers' work is U.S. Patent No. 2,071,250 (1937), which discusses some of the previous work in the field and some of the problems in drawing polyesters into fibers. Carothers produced filaments from his polyesters, but they were low-melting and lacked hydrolytic stability.

The current prior art describes various linear condensation polyesters derived from dihydroxy compounds and dibasic acids, such as terephthalic acid, which are capable of being drawn into fibers showing, by characteristic X-ray patterns, orientation along the fiber axis. However, in using a single glycol and single acid to prepare a polyester, one is limited to a fixed crystal structure and melting point since the constitution of the polymer cannot be varied.

In recent years a limited amount of work has been done involving bibenzoic acid and its esters in connection with homopolyesters. The prior art indicates, however, that this work was not generally fruitful, for a homopolyester of bibenzoic acid and a glycol (e.g. polyethylenebibenzoate) possesses an extremely high melting point making its use in shaped articles entirely impractical, particularly when attempts were made to use it as a film or fiber-forming material. Moreover, and possibly more important, known polybibenzoates exhibit an extremely high rate of crystallization, making orientation of fibers or films therefrom extremely difficult and costly, if not impossible, from a commercial standpoint.

This invention overcomes these limitations in providing as one of its objects new and useful highly polymeric interpolyesters of a glycol, bibenzoic acid and a straight or branched chain aliphatic dicarboxylic acid having valuable properties, including those of being capable of being formed into useful filaments, films and the like. It is a further object of this invention to provide unique interpolyesters as described above which possess melting points and rates of crystallization which make them amenable to the preparation of new and useful fibers, films, molded products, coatings, other shaped articles and the like. A still further object is the provision of unique interpolyesters having a low degree of solubility in organic solvents. A further object is the provision of new and useful synthetic filaments and films possessing improved moisture regain characteristics. Another object is the provision of new and useful synthetic fibers, film and molded objects having improved dyeing characteristics. A still further object is the provision of a new process for making the unique interpolyesters of this invention. Other objects will appear hereinafter.

The synthetic products according to the present invention are difficultly soluble, usually crystallizable, orientable, highly polymerized interpolyesters of (1) bibenzoic acid, having the general formula:

(2) an aliphatic dibasic acid having the general formula:

HOOC—R—COOH wherein R is a bivalent straight or branched chain saturated aliphatic hydrocarbon radical containing 1 to 12 carbons, and (3) a glycol or dihydric alcohol having the general formula HO—Z—OH wherein Z represents the radicals intermediate the hydroxyl groups of the following glycols:

(a)          HO—(R'X)$_n$—R'OH wherein R' is a bivalent straight or branched chain aliphatic hydrocarbon radical containing 2 to 10 carbon atoms, X is an ether oxygen or sulfone and $n$ is an integer from 1 to 6, or (b)         HO—(CH$_2$)$_m$—Ar—(CH$_2$)$_m$—OH wherein Ar is a mono- or di-nuclear aromatic hydrocarbon radical containing 6 to 12 nuclear carbon atoms and $m$ is an integer from 1 to 4, or (c) HO—(R'X)$_n$—(CH$_2$)$_p$—Ar—(CH$_2$)$_p$—(XR')$_n$—OH wherein R', X and $n$ are the same as in (a), Ar is the same as in (b), and $p$ is an integer from 0 to 4, or (d)         HO(CH$_2$)$_p$—R''—(CH$_2$)$_p$—OH wherein R'' is an alicyclic hydrocarbon radical containing 4 to 6 carbon atoms and $p$ is the same as in (c), or (e) HO—(R'X)$_n$—(CH$_2$)$_p$—R''—(CH$_2$)$_p$—(XR')$_n$—OH wherein R', X and $n$ are the same as in (a), $p$ is the same as in (c), and R'' is the same as in (d).

The polyesters of the present invention possess, among others, the following superior fiber and film properties: (1) controlled melting points over a relatively wide range, i.e. above 140° C. and preferably 200°–270° C., (2) toughness, (3) controlled crystallizability dependent upon thermal and orienting treatment, (4) orientability, (5) pliability, and (6) lack of color. Items (1) and (3) are important in order that the fiber or film have good thermal and dimensional stability, as well as orientability, under a variety of conditions. The advantages of toughness, pliability and lack of color are readily apparent. In order that these latter characteristics be attained, the fiber or film forming polymer must not crystallize too rapidly; otherwise it will not be possible to properly orient it. In other words, it must be capable of being easily converted to an amorphous form which can be oriented by cold or hot drawing or other known orienting procedures. On the other hand, the fiber or film-forming polymer must have latent ability to crystallize, for if it does not it is then brittle toward impact and possesses poor dimensional stability.

In preparing the unique interpolyesters of this invention bibenzoic acid, or a diester or acid chloride thereof, is reacted with the aliphatic dicarboxylic acid described above, or a diester or acid chloride thereof, and one of glycols described above. An ester interchange reaction is generally preferred, since the time required to form the interpolyesters of this invention is generally considerably less, and/or side reactions can generally be minimized to a greater degree than when the free dicarboxylic acids are employed.

The ester interchange method for preparing the interpolyesters of this invention proceeds in three stages:

I. One mole of a mixture of a diester of bibenzoic acid and a diester of one of the saturated aliphatic dicarboxylic acids described above is reacted in the presence of heat and an ester interchange catalyst with at least two moles of a glycol and a monohydric alcohol is distilled off;

II. The temperature is gradually raised to bring about polymerization and excess glycol is distilled off; and III. Polymerization is driven to completion by gradually reducing the pressure to remove the last traces of glycol.

The overall process is illustrated by the following equations:

(I)

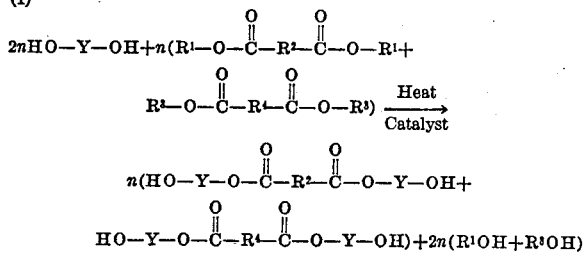

(II and III)

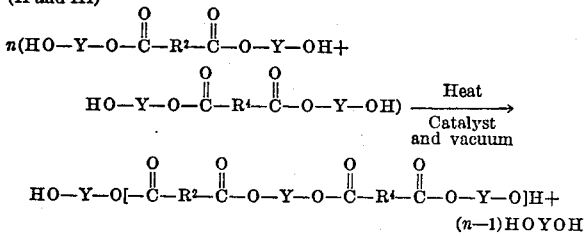

wherein Y is a bivalent hydrocarbon or hetero hydrocarbon radical as described in (a) through (e) above; $R^1$ and $R^3$ are same or different hydrocarbon radicals derived from a straight or branched chain aliphatic primary or secondary monohydric alcohol boiling within the range from about 64° to 215° C.; $R^2$ is hydrocarbon residue of bibenzoic acid and $R^4$ is the hydrocarbon residue of one of the aliphatic dicarboxylic acids described above.

In a preferred embodiment of this invention, the mixture of monomeric diesters described above (in a ratio of about 40 to 90 mol percent of a bibenzoate and about 60 to 10 mol percent of an aliphatic dicarboxylate) and a glycol are weighed into a vessel, the ester interchange catalyst added, and a boiling chip introduced. Stage I ester interchange is then carried out at atmospheric pressure under nitrogen at a temperature between about 150° and 225° C. (preferably 175° to 200° C.) for about 2 to 10 hours, distilling off monohydric alcohol. Polymerization is then brought about in stage II by raising the temperature gradually to between about 200° and 400° C. (preferably about 260° to 290° C.) over a period of about ½ to 2 hours, continuing polymerization for a period of about ½ to 3 hours at this temperature and distilling off excess glycol. In stage III pressure is gradually reduced to below about 5 mm. (preferably 0.2 to 0.5) over a period of about ½ to 4 hours (preferably about 1 to 2 hours), followed by continued heating at this elevated temperature and reduced pressure for a period of about 2 to 10 hours. In this latter step the last traces of the glycol are distilled off and the reaction mixture becomes progresssively more viscous.

The specific temperatures and heating periods may vary over wider ranges than those outlined above depending on the observed rate of reaction. In cases where reaction becomes sluggish, higher temperature and/or longer periods of time will be employed. In those cases where the polymer is solidified, or begins to solidify before it is apparent all glycol has been removed, the temperature and/or the heating period are increased. The conditions can be varied considerably depending upon the degree of the polyesterification desired, the ultimate properties sought, stability of the polyester being produced and use for which the product is intended. When the desired viscosity is reached under these conditions in stage III, evacuation and heating are discontinued, an inert gas admitted, the vessel allowed to cool to approximately room temperature and the polyester removed.

In theory a total of only one mole of one of the glycols is necessary to effect complete polyesterification with one mole of the mixed monomer diesters described herein; however, in practice, it is difficult to attain complete reaction under these conditions. It is therefore usually necessary to utilize an excess of the glycol, preferably at least two moles of glycol to one mole of mixed monomer diesters. Quantities substantially larger than about 2 moles of the glycol may be used; however, since they are not necessary, in the interests of economy, they are not recommended.

Examples of some of the various monomeric diesters which can be employed in accordance with the process of the invention include those derived from bibenzoic acid, one of the aliphatic acids of this invention and one of the following primary monohydric alcohols: methanol, ethanol, propanol-1, 2-methyl-propanol-1, butanol-1, 2-methyl-butanol-4, 2,2-dimethyl propanol-1, pentanol-1, 2-methyl-pentanol-1, 2-methyl-pentanol-5, 3-methylol-pentane, hexanol-1, 2-methyl-hexanol-1, 2-methyl-hexanol-6, heptanol-1, 2-ethyl-hexanol-1, octanol-1, nonanol-1, 2,6-dimethyl-3-methylol-heptane. Diesters derived from these same acids and secondary monohydric alcohols can be utilized also, e.g. propanol-2, butanol-2, 2-methyl-butanol-3, pentanol-2, pentanol-3, 2-methyl-pentanol-3, 3-methyl-pentanol-2, hexanol-2, 2,2-dimethyl-butanol-3, 2-methyl-hexanol-3, heptanol-4, octanol-2, decanol-4.

Since in the preferred process, the alcohols from which the diesters are derived are removed from the reaction zone by boiling, it is generally necessary to utilize a glycol having a boiling point higher than that of the alcohol being evolved. Examples of some of the glycols described in (a) through (e) above are as follows:

(a) Diethylene glycol, triethylene glycol, tetraethylene glycol, dipropylene glycol, 4,4'-dihydroxy-dibutyl ether, other polyoxyalkylene glycols having 1 to 6 oxyalkylene units wherein said oxyalkylene unit contains 1 to 10 carbon atoms, 2,2'-sulfonyl-diethanol,
4,4'-sulfonyl-dibutanol,
3,3'-[sulfonyl-bis-(3-propyl-sulfonyl)]-dipropanol,
4,4'-[-1,4-butylene-disulfonyl-bis-(4-butyl-sulfonyl)]-dibutanol,
sulfonyl-bis-(4-butyl-sulfonyl-4-butyl-sulfonyl-4-butanol),
6,6'-(1,6-hexylene-disulfonyl)-dihexanol,
sulfonyl-bis-[3-(2,2-dimethyl) propanol],
1,3-(2,2-dimethyl)-propylene-disulfonyl-bis-[3-(2,2-dimethyl)-propyl-sulfonyl-3-(2,2-dimethyl)-propanol],
sulfonyl-bis-[4-(2,2,3,3-tetramethyl)-butanol], etc., (b) p-Xylylene glycol, 3,6-bis-(hydroxymethyl)-durene,
4,4'-bis-(hydroxymethyl)-biphenyl,
2,6-bis-(hydroxymethyl)-naphthalene,
1,5-bis-(γ-hydroxypropyl)-naphthalene,
1,4-bis-(β-hydroxyethyl)-benzene,
1,4-bis-(γ-hydroxypropyl)-benzene,
3,6-bis-(β-hydroxyethyl)-durene, etc.

(c) 2,2'-p-phenylene-dioxy)-diethanol,
3,3'-(p-xylylene-dioxy)-dipropanol,
4,4'-(p-phenylene-disulfonyl)-dibutanol,
6,6'-(p-xylylene-disulfonyl)-dihexanol,
2,2'-(4,4'-biphenylene-dioxy)-diethanol,
(1,5-naphthalene-disulfonyl)-dimethanol,
2,2'-[p-phenylene-dioxy-bis-(2-ethoxy-2-ethoxy)]-diethanol,
2,2'-[p-phenylene disulfonyl-bis-(2-ethyl-sulfonyl)]diethanol, etc.

(d) 1,4-cyclohexane-β,β'-diethanol,
1,4-cyclohexane-δ,δ'-dibutanol, the dihydric alcohol derived from α-pinene having the formula:

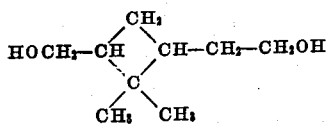

etc.;

(e) 1,4-cyclohexane-dioxy-β,β'-diethanol,
1,4-cyclohexane-disulfonyl-β,β'-diethanol,
1,4-cyclohexane-β,β'-diethoxy-β,β'-diethanol,
1,4-cyclohexane-bis-(γ-propoxy-γ-propoxy-γ-propanol),

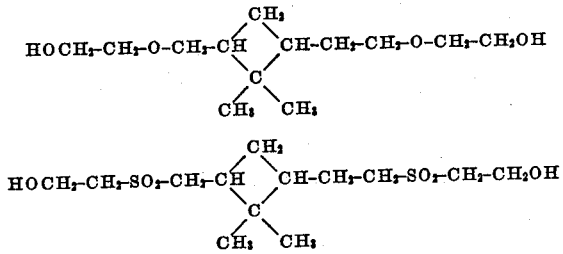

etc.

Examples of some of the aliphatic dicarboxylic acids suitable for the purposes of this invention include malonic, succinic, glutaric, adipic, pimelic, suberic, azelaic, un-decandioic (1,9-nonane-dicarboxylic acid), dodecandioic (1,10-decane-dicarboxylic acid), methyl-malonic, dimethyl-malonic, diethyl-malonic, α-methyl-succinic, α,α'-dimethyl-succinic, tetramethyl-succinic, β,β-dimethyl glutaric, α,α,α',α'-tetramethyl adipic, β,β,β',β'-tetramethyl adipic, etc.

The properties of films, fibers, or other molded objects which constitute a preferred embodiment of this invention vary greatly depending in a large measure upon the identity of the glycol utilized to form the interpolyester. Thus melting points, degree of crystallinity, rate of crystallizing, etc. will vary considerably. Interpolyesters formed from different glycols within any one of the groups (a) and through (e) above will generally be substantially similar to one another in their properties. On the other hand, those formed from different glycols chosen from different groups may vary greatly in their properties. In a like manner, the quantity and, to a lesser degree, the identity of the acid described above in (2) can cause substantial variation in the properties of the interpolyesters of this invention. Accordingly, although the use of bibenzoic acid in a quantity in the range of 40 to 90 mol percent is generally satisfactory, a range of 50 to 80 mol percent is generally preferred where formation of films or fibers is contemplated.

The catalytic condensing agents or ester-interchange catalyst which may be employed are conventional ones and include, for example, the alkali metals, the alkaline earth metals; the oxides, carbonates, and borates of these two groups of metals, the one to six carbon alkoxides of these two groups of metals; magnesium, zinc, and manganese; the oxides of these metals; zinc borate; the sulfates, phosphates and acetates of zinc, cadmium, magnesium aluminum and copper; litharge or a combination of litharge with antimony trioxide and triphenyl phosphite as described in U.S. Patent No. 2,650,213; compounds of the formula:

M(Al(OR)₄)

wherein M is an alkali metal, e.g. lithium, sodium, or potassium, and R is an alkyl radical containing from 1 to 6 carbon atoms; R can be derived from a lower aliphatic alcohol such as methyl, ethyl, propyl, n-butyl, isobutyl, n-amyl, etc., as described in U.S. 2,720,506; a composition consisting of lithium hydride and a glycol-soluble organic salt of cadmium, magnesium, or zinc as described in U.S. Patent No. 2,681,360.

From about 0.005% to about 0.2% of such catalysts based on the weight of diester monomer being condensed may be employed. Higher or lower percentages may be employed. Generally, from about 0.01% to about 0.05% of the catalytic condensing agent can be advantageously employed, based on the weight of dibasic acid diester being condensed. As will be apparent to those skilled in the art, it is generally advantageous from a cost standpoint to utilize the minimum quantity of one of the above catalysts which effect optimum results. Obviously, however, quantities larger or smaller than those outlined above will be employed by those skilled in the art where needed, e.g. to accelerate or decelerate rate of reaction, to modify properties—luster, molecular weight, tenacity, etc.

The reaction can be carried out in the presence or absence of a solvent, preferably the latter. Illustrative of such solvents are inert high boiling compounds, such as diphenyl ether, diphenyl, mixed tolyl sulfones, chlorinated naphthalene, chlorinated diphenyl, dimethyl sulfolane, etc.

It is essential to exclude oxygen and moisture at all stages of the condensation reaction. Otherwise discoloration, low molecular weight, and/or insolubilization of the polyester results. Inert atmospheres which can advantageously be employed include nitrogen, hydrogen, helium, etc. The exclusion of moisture is readily effected by employing substantially anhydrous reactants.

The interpolyesters of this invention can be formed into filaments or films by conventional melt extrusion procedures. For example, the interpolyesters can be melt extruded vertically at a melt temperature of approximately 250 C. above the melting point of the interpolyester followed by immediate quenching and orientating.

The following examples are not given by way of limitation, the scope of the invention being determined by the appended claims.

EXAMPLE 1

*Polyxylylene bibenzoate/sebacate, 80/20 mol percent*

A polymerization vessel fitted with an exit tube, water cooled condenser and water cooled receiver was charged with 14.32 grams (0.048 mole) diethyl bibenzoate, 3.10 grams (0.012 mole) diethyl sebacate and 18.24 g. (0.132 mole) p-xylylene glycol. To this mixture were added 0.01 g. zinc acetate, 0.01 g. manganous acetate and 0.005 g. lithium hydride as a mixed catalyst for ester interchange and a boiling chip to prevent bumping during subsequent heating. The polymerization vessel was evacuated and flushed with oxygen-free nitrogen four times prior to heating, then heated rapidly to 190° C. during which time the reactants melted with rapid evolution of ethanol. The initial ester interchange to produce the mixed glycol esters was carried out at 190° C. for four hours to assure complete conversion to the desired products resulting in thin mobile clear liquids which on cooling solidified to opaque pasty solids. The vessel was gradually heated to 280° C. over a one hour period. The polymerization temperature was maintained at 280° C. while the pressure was gradually reduced over a one hour period to less than 1 mm. and polymerization continued under these conditions for an additional six hours. The polymer thus produced was a tan colored liquid which crystallized to a tan opaque solid on cooling, having a birefringent melting point of 240° C.

EXAMPLE 2

*Polyxylylene bibenzoate/succinate, 60/40 mol percent*

A polymerization vessel fitted with an exit tube, water cooled condenser and a water cooled receiver was charged with 10.74 grams (0.036 mole) diethyl bibenzoate, 4.18 grams (0.024 mole) diethyl succinate and 18.24 g. (0.132 mole) p-xylylene glycol. To this mixture were added 0.01 g. zinc acetate, 0.01 g. manganous acetate and 0.005 g. lithium hydride as a mixed catalyst for ester interchange and a boiling chip to prevent bumping during subsequent heating. The polymerization vessel was evacuated and flushed with oxygen-free nitrogen four times prior to heating, then heated rapidly to 180° C. during which time the reactants melted with rapid evolution of ethanol. The initial ester interchange to produce the mixed glycol esters was carried out at 180° C. for four hours to assure complete conversion to the desired products resulting in thin mobile clear liquids which on cooling solidified to pasty solids. The vessel was gradually heated to 260° C. over a one hour period. The polymerization temperature was maintained at 260° C. while the pressure was gradually reduced over a one hour period to less than 1 mm. and polymerization continued under these conditions for an additional six hours. The polymer thus produced was a yellow colored liquid which crystallized to a yellow opaque solid on cooling, having a birefringent melting point of 230° C.

EXAMPLE 3

A polymerization vessel fitted with an exit tube, water cooled condenser and a water cooled receiver was charged with 11.72 grams bibenzoyl chloride, 4.3 grams sebacyl chloride and 8.29 g. p-xylylene glycol. To this mixture were added 20 ml. of dioxane as a solvent. The polymerization vessel was flushed with oxygen-free nitrogen and heated to reflux temperature for 6 hours with evolution of hydrogen chloride. The resulting slurry was diluted with 200 ml. of dioxane and filtered to remove precipitated polymer. The latter was washed with acetone and dried at 110° C. The polymer thus produced was a fine white powder with a birefringent melting point of 225° C.

EXAMPLE 4

A polymerization vessel fitted with an exit tube, water cooled condenser and a water cooled receiver was charged with 11.72 grams bibenzoyl chloride, 4.3 grams sebacyl chloride and 6.97 g. cis-1,4-quinitol. To this mixture were added 20 ml. of dioxane as a solvent. The polymerization vessel was flushed with oxygen-free nitrogen and heated to reflux temperature for 5.5 hours with stirring resulting in evolution of hydrogen chloride. The resulting slurry was diluted with 200 ml. of dioxane and the precipitated polymer isolated by filtration, the polymer was washed with acetone and dried at 110° C. The polymer thus produced was a fine white powder with a birefringent melting point of about 250° C.

EXAMPLE 5

A polymerization vessel fitted with an exit tube, water cooled condenser and a water cooled receiver was charged with 14.32 grams diethyl bibenzoate, 3.10 grams diethyl sebacate and 14.0 g. diethylene glycol. To this mixture were added 0.01 g. zinc acetate, 0.01 g. manganous acetate and 0.005 g. lithium hydride as a mixed catalyst for ester interchange and a boiling chip to prevent bumping during subsequent heating. The polymerization vessel was evacuated and flushed with oxygen-free nitrogen 3 times prior to heating, then heated rapidly to 190° C. during which time the reactants melted with rapid evolution of ethanol. The initial ester interchange to produce the mixed glycol esters was carried out at 190° C. for 4 hours to assure complete conversion to the desired products resulting in thin mobile clear liquids which on cooling solidified to white opaque pasty solids. The vessel was gradually heated to 260° C. over a 1 hour period. The polymerization temperature was maintained at 260° C. while the pressure was gradually reduced over a 1 hour period to less than 1 mm. and polymerization continued under these conditions for an additional 4.5 hours. The polymer thus produced was a viscous straw colored liquid which crystallized to a buff opaque solid on cooling. The polymer had a birefringent melting point of 125° C. and formed fibers and transparent flexible films.

EXAMPLE 6

A polymerization vessel fitted with an exit tube, water cooled condenser and a water cooled receiver is charged with 12.56 grams bibenzoyl chloride, 3.59 grams sebacyl chloride and 11.88 g. 2,2'-(p-phenylenedioxy)-diethanol. To this mixture is added 20 ml. of dry o-dichlorobenzene as a solvent. The polymerization vessel is flushed with oxygen-free nitrogen and is heated to 165° C. for 5 hours with evolution of hydrogen chloride. The solvent is removed by distillation and the polymer is heated for an additional two hours at 270° C. The crystalline tan polymer can be formed into fibers and films.

Although illustrated in the preferred embodiment as a batch process, the interpolyesters of this invention can be produced by continuous methods also; for example, the required amounts of the several reactants and catalyst can be continuously metered into the reaction vessel, maintained therein for the required reaction time under the required reaction conditions of temperature and pressure and then continuously drawn off.

In some instances, it is not practicable to utilize the ester interchange method described above to prepare the interpolyesters of this invention. Accordingly, another preferred embodiment in the present invention involves the reaction of a mixture of diacid chlorides and a glycol. According to this embodiment, interpolyesters are prepared by mixing substantially molecular equivalent quantities of the glycol and the two dibasic acid chlorides. In some cases, it is preferred to add the glycol to the mixture of dibasic acid chlorides in successive portions at a rate such that there is no appreciable accumulation of unreacted glycol. However, it is generally sufficient to merely mix the three reactants in a single step. If one or the other of the reactants is a solid at room temperature, it may be necessary to warm the mixture or to use a solvent in order to bring about complete solution of the reactants. The working examples herein, it will be noted, utilize both of these expedients, since the use of a solvent and an elevated temperature is the preferred mode of operation. In this initial step, if an elevated temperature is utilized, it is generally only necessary to heat to a reflux temperature.

During this initial step, rapid and copious evolution of hydrogen chloride takes place and is usually accompanied by a spontaneous rise in temperature. After the bulk of the hydrogen chloride has evolved, the mixture is then warmed gradually to a temperature in excess of about 200° C. accompanied generally by removal of the solvent by distillation. At times, it is preferable to utilize reduced pressure, i.e., below about 5 mm. of mercury, in conjunction with the second heating step in order to affect adequate polymerization to produce satisfactory molecular weights.

It is necessary in the diacid chloride method of preparing the interpolyesters of this invention to guard against there being any substantial excess of glycol in the final product. In a preferred embodiment, it is generally desirable for the polymer to possess a molecular weight of 10,000 or greater. Accordingly, it is generally necessary to prevent the inclusion of more than about a one percent excess of glycol in the finished product. On the other hand, it is sometimes possible to produce some of the interpolyesters of this invention wherein the final product may contain as much as a 2½% excess over the molecular equivalent amount. This does not mean necessarily that the glycol in the reactants as charged should not exceed either of these limitations (i.e. either 1% or 2½% excess), for it has been observed that at times, small amounts of the glycol may be lost by volatilization, entrapment, etc. Thus, simply by observation, the optimum quantity to be charged can be determined from the optimum quantities found in the finished product.

We claim:

1. A filament and film forming linear interpolyester melting above 140° C. of components consisting essentially of a mixture of dicarboxylic acids and at least two mols per mol of mixed acids of a glycol having the general formula

HO—Z—OH wherein Z is a radical selected from the group consisting of —(R'O)$_n$—R'—, —(CH$_2$)$_m$—Ar—(CH$_2$)$_m$—, —(R'O)$_{n'}$—(CH$_2$)$_p$—Ar—(CH$_2$)$_p$—(OR')$_{n'}$— and —(CH$_2$)$_p$—R''—(CH$_2$)$_{p'}$—, wherein R' is an aliphatic hydrocarbon radical containing 2 to 10 carbon atoms, n is an integer of from 1 to 6, n' is an integer of from 1 to 2, Ar is from the group consisting of mono- and di-nuclear arylene radicals containing 6 to 12 carbon atoms, m is an integer of from 1 to 4, p and p' are integers of from 0 to 2 and R'' is a saturated alicyclic hydrocarbon radical containing 6 carbon atoms; said mixture of dicarboxylic acids consisting essentially of from 40 to 90 mol percent of p,p'-bibenzoic acid and from 60 to 10 mol percent of an aliphatic dicarboxylic acid having the general formula

HOOC—R—COOH wherein R is a bivalent saturated aliphatic hydrocarbon radical containing 1 to 12 carbon atoms.

2. The filament and film forming linear interpolyester of claim 1 wherein the mixture of dicarboxylic acids consists essentially of from 50 to 80 mol percent of p,p'-bibenzoic acid and from 50 to 20 mol percent of the aliphatic dicarboxylic acid.

3. Process of preparing filament and film forming linear interpolyesters melting above 140° C. which comprises reacting the components consisting essentially of a mixture of from 40 to 90 mol percent of a lower alkyl diester of p,p'-bibenzoic acid and from 60 to 10 mol percent of a lower alkyl diester of an acid having the following general formula:

HOOC—R—COOH wherein R is a bivalent saturated aliphatic hydrocarbon radical having from 1 to 12 carbon atoms, and a glycol having the general formula

HO—Z—OH wherein Z is a radical selected from the group consisting of —(R'O)$_n$—R'—, —(CH$_2$)$_m$—Ar—(CH$_2$)$_m$—, —(R'O)$_{n'}$—(CH$_2$)$_p$—Ar—(CH$_2$)$_p$—(OR')$_{n'}$— and —(CH$_2$)$_p$—R''—(CH$_2$)$_{p'}$—, wherein R' is an aliphatic hydrocarbon radical containing 2 to 10 carbon atoms, n is an integer of from 1 to 6, n' is an integer of from 1 to 2, Ar is from the group consisting of mono- and di-nuclear arylene radicals containing 6 to 12 carbon atoms, m is an integer of from 1 to 4, p and p' are integers of from 0 to 2 and R'' is a saturated alicyclic hydrocarbon radical containing 6 carbon atoms; said reaction taking place at a temperature above 150° C. in the presence of an ester interchange catalyst and in the absence of oxygen and moisture.

4. The process of claim 3 wherein the initial reaction temperature is kept from 150 to 225° C. until no further alcohol is liberated and thereafter the temperature is raised to from 200 to 400° C. with a gradual reduction of reaction pressure to less than 5 mm. of mercury.

5. The process of claim 4 wherein the initial temperature ranges from 175 to 200° C., the temperature is raised to from 260 to 290° C. and the pressure is reduced to from 0.2 to 0.5 mm. of mercury.

References Cited in the file of this patent

UNITED STATES PATENTS

| | | |
|---|---|---|
| 2,437,046 | Rothrock et al. | Mar. 2, 1948 |
| 2,727,881 | Caldwell et al. | Dec. 20, 1955 |
| 2,762,789 | Fisher | Sept. 11, 1956 |

OTHER REFERENCES

Page 331, Bennett; Concise Chemical and Technical Dictionary, published 1957, Chemical Publishing Co., Inc., Brooklyn, N.Y.